June 24, 1952  C. O. BALLOU  2,601,583
RADIATION MEASURING INSTRUMENT
Filed May 26, 1947  2 SHEETS—SHEET 1

INVENTOR.
Charles O. Ballou
BY

June 24, 1952     C. O. BALLOU     2,601,583
RADIATION MEASURING INSTRUMENT
Filed May 26, 1947     2 SHEETS—SHEET 2
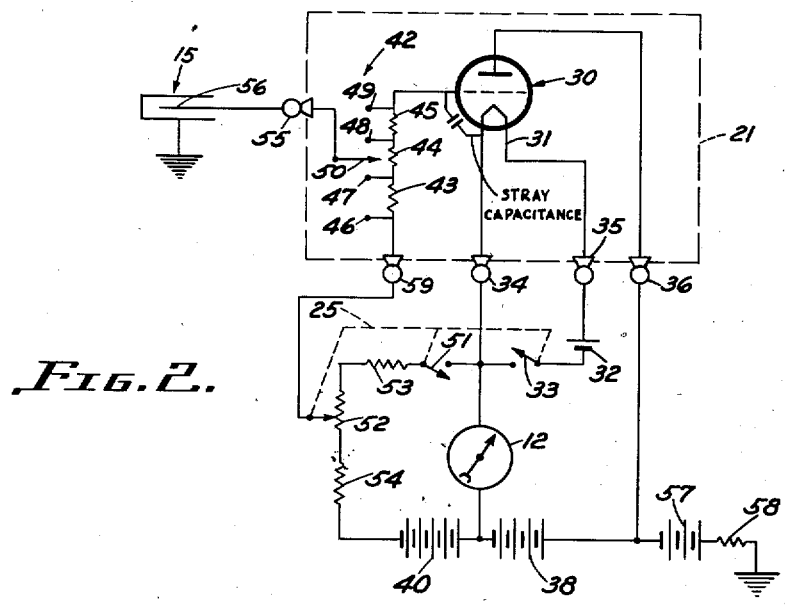
FIG. 2.
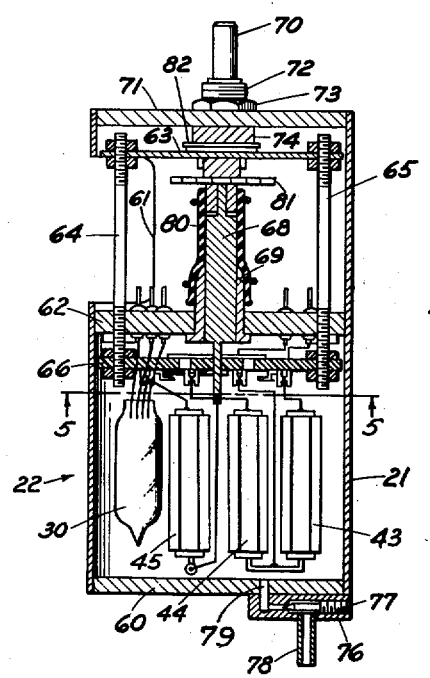
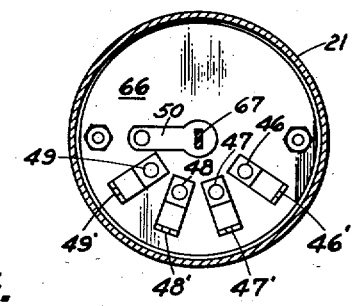
FIG. 3.     FIG. 5.
INVENTOR.
Charles O. Ballou
BY Patented June 24, 1952

UNITED STATES PATENT OFFICE 2,601,583

RADIATION MEASURING INSTRUMENT

Charles O. Ballou, Wilmington, Del., assignor to the United States of America as represented by the United States Atomic Energy Commission Application May 26, 1947, Serial No. 750,468

9 Claims. (Cl. 250—27)

This invention relates to an improved radiation measuring instrument or radiation meter of the type used for measuring beta and gamma radiation, for example, the meter being of the general type wherein the amount of radiation present is measured in accordance with the amount of ionization produced thereby in an ionization chamber. The current from the ionization chamber, of course, is amplified prior to indication by a microammeter.

This invention is concerned especially with providing a portable radiation meter of a very convenient, compact, and readily usable form, that is, of a design and construction adapting the meter to be manually used wherever desired and adapted to convenience in probing wherever it may be necessary to test for radiation.

Radiation meters of this general type and category, that is, portable electronic radiation survey instruments, have in the past left a good deal to be desired and have established an unfavorable reputation with field users, primarily due to their instability, failure to hold calibration, and spurious response.

The disabilities of these instruments have now been found to be due to cathode destabilization, variable leakage resulting from humidity, and to ionization of air in the proximity of vacuum tube leads. Cathode destabilization results from the simultaneous application of plate and cathode heating potentials which causes the amplifier tube to operate momentarily under "temperature limited" conditions. Failure to hold calibration results from the change, due to variable humidity, in the resistance of the very high resistance elements and surface leakage of very high resistance insulators. Spurious response is due to ionization of air in the proximity of the vacuum tube leads and is a function of the intensity of ionization in this region. Inasmuch as ion producing fields may be non-uniform, spurious variable readings may be obtained when the vacuum tube leads are exposed to a radiation field which is different from the radiation field which is ionizing the gas in the chamber. Further, under conditions of intense radiation, ionization of air between the grid and negative filament lead may result in conditions such that the grid collects electrons from the ionized air and may actually produce reversed readings.

With reference to cathode destabilization, most vacuum tubes are operated under "space charge limited" conditions. These tubes are designed so that under normal operating conditions the cathode gives off a copious surplus of electrons, with the result that the anode current is limited by the mutual repulsion between the electrons and not by the emission capabilities of the cathode.

If such a tube were to be operated with a cathode temperature below that at which an excess of electrons are emitted, as demanded by the grid and plate potential gradients, the space charge would no longer exist with the result that substantially all the electrons emitted by the cathode would be drawn to the anode and/or other electrodes. Tubes operated under these conditions are operating under so called "temperature limited" conditions. The operation of tubes under "temperature limited" conditions produces destructive forces at the cathode and results in varying degrees of damage of the cathode unless the cathode is specifically designed for such use.

In the manufacture of vacuum tubes considerable attention is given to the treatment of cathodes to develop maximum emission characteristics, long life, and high stability. In the case of small battery operated electrometer tubes, particular care in the treatment of the cathode is given to develop maximum stability; however, if these filaments or cathodes are operated only momentarily under "temperature limited" conditions, temporary damage to the cathode coating occurs and manifests itself as either reduced plate current, instability, or both. Tubes in many previous embodiments of portable electrometers were temporarily operated under "temperature limited" conditions while the cathode was heating to normal operating temperature immediately after turning the amplifier on. This produced temporary destabilization which tended to correct itself when the tube was operated at normal ratings. The time required for restabilization of such a cathode varies between minutes and hours, depending upon the conditions which caused the destabilization, and upon the operating conditions during the restabilizing period.

The foregoing explains the conditions which give rise to cathode destabilization as a factor related to the disabilities enumerated above which radiation measuring instruments have been subject to. My invention proposes a way of eliminating the cathode destabilization by specific means which will be referred to again in the enumeration of objects of the invention below.

From the foregoing it will be apparent that the achievement of the objects of my invention of providing a portable radiation meter, having the desired characteristics, involves meeting a number of rather rigid requirements. The meeting of these requirements in achieving my invention is calculated to overcome the objections which field users of this type of instrument have heretofore had to previously known instruments. Among the particular requirements which my invention has as an object to meet is the ability to reduce leakage, due to moisture precipitated on insulators by variable or high humidity, to such a low value that the instrument may be adjusted to zero and will provide accurate readings of radiation intensity regardless of humidity conditions.

Another object of my invention is to provide an instrument as described, capable of dependably holding its calibration within at least 10% for prolonged periods of time.

Another object of the invention is to avoid cathode destabilization by providing for automatic space charge limiting of the amplifier tube during its warm-up period, the arrangement involving circuit combinations or networks such that the inherent time delay in the circuit provides for the space charge limiting without the use of thermal time delays, time delay relays, or tubes, etc.

Another object of the invention is to provide an instrument which is free of spurious response, that is, an instrument in which there are no false or ungenuine responses, and particularly that type of spurious response which has been given rise to in the past by reason of the tube, that is, the associated grid circuit, collecting ions or electrons from the filament, plate or shielding circuits when the instrument is subject to radiation.

Another particular object of my invention is to effectuate the previously stated object by providing a vacuum chamber enclosing the amplifier tube and its associated grid wiring and circuits, for the purpose of eliminating spurious response from effects associated with the tube and its grid circuit, and to otherwise minimize the deleterious effects of humidity.

Another object of my invention is to provide a radiation meter, or radiation measuring instrument, having optimum stability characteristics and freedom from drift after establishing normal operating conditions following a brief warm-up period.

Another object is to provide in the amplifier circuit for the radiation meter, arrangements, whereby there is a very restricted zeroing range so that as a result the operator of the instrument will be warned of conditions which would affect the calibration of the radiation meter, such as low or defective batteries, excessive insulation leakage between circuit elements, and a changed or defective amplifier tube.

Numerous other objects and advantages of my invention will become apparent from the detailed description and annexed drawings wherein Fig. 1 is a perspective showing of the entire instrument.

Fig. 2 is a wiring diagram of the ionization chamber and amplifier of the meter, that is, the instrument.

Fig. 3 is a view in detail of the component parts including the vacuum chamber which incloses the amplifier tube and the sensitivity control switch.

Fig. 5 is a detail view taken along line 5—5 of Fig. 3.

Figure 1:
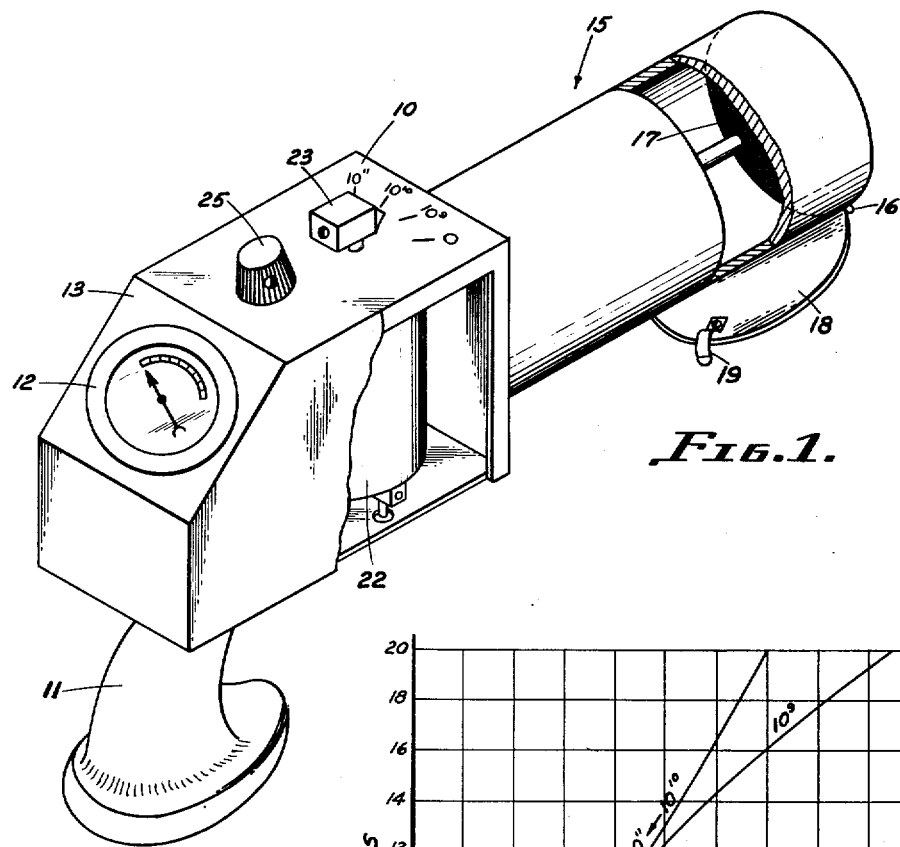

Referring to Fig. 1 of the drawing, the instrument is shown as comprising a housing or cabinet 10 in which the principal component parts of the instrument, other than the ionization chamber, are contained. The cabinet 10 is rectilinear in configuration as shown, and at the bottom it has a pistol grip 11, attached to the instrument so it can be conveniently carried and moved about from place to place and adapting the instrument to probing to determine the existance of radiation. The cabinet 10, has a slanting face or panel 13, in which is mounted the meter 12, on which is read the ionization current, as will be described presently. As will be seen, the meter 12 is conveniently located with reference to the instrument to enable the operator to read the meter with ease while probing. The instrument includes an ionization chamber 15, which in itself is constructed in accordance with the known principles upon which ionization chambers operate. The chamber 15 comprises a cylinder as shown on Fig. 1 and it may be preferably made of Bakelite and lined with graphite, that is, having a graphite coating on its inner surface. The cylinder is maintained at ground potential, as will be described, and the ionization chamber has a central longitudinal electrode therein but insulated therefrom in accordance with the usual manner of construction of ionization chambers. The end of the ionization chamber, that is, the cylinder 15 is made sensitive to beta radiation by having a nylon covering or window 17, which is visible on Fig. 1. When the instrument is used for measuring gamma radiation in the presence of beta radiation, the end of the ionization chamber 15, that is, the nylon window, may be covered by a hinged door 18, having a hinge 16, which closes over the end of the ionization chamber and fastens by means of a spring clip 19. The cabinet 10 is shown in Fig. 1 with part of a side panel broken away and this side panel may have a calibration chart secured thereon. This chart, as may be seen in Fig. 5, shows calibration curves and reads MR/HR against the instrument reading, which is related to the ionization current, there being a separate MR scale for each of the sensitivity settings of the instrument.

As may be seen on Fig. 1, cabinet 10 has within it, in a vertical position, a cylindrical component 22, as will be described, consisting of a vacuum tight enclosure in which is disposed the amplifier tube and the sensitivity control. The sensitivity adjusting knob is designated by the numeral 23 and is disposed on the top of the cabinet 10, it being a manually adjusted button with a pointer moving adjacent a graduated scale having four graduations, one of which is zero and the others, respectively, $10^9$, $10^{10}$, and $10^{11}$. The switch or button for turning the amplifier on and off and adjusting the zero setting of the instrument is on top of the cabinet 10 and designated by numeral 25.

Referring now to Fig. 2 of the drawings, the vacuum chamber 21 is indicated diagrammatically on this figure in broken lines. The amplifier tube designated by the numeral 30 is a tube which is known commercially as the Victoreen V-32 tube. This particular tube was chosen, having in mind the consideration, that provided a single tube could be used as a current amplifier and the circuit and tube made sufficiently stable to meet requirements, the arrangement would be unusually attractive from the standpoint of a reduction in battery supply requirements with resultant improvement in portability. The filamentary cathode 31 is heated by current from a 1½ volt battery 32 and in the cathode circuit is one blade 33 of the control switch 25 which is a multiple throw switch for turning the amplifier on and off. This switch will be referred to again presently. The cathode leads pass through Kovar seals 34 and 35 where they pass into the evacuated chamber 21. This type of seal is well known in the art and requires no further description. The plate voltage is supplied by a 7½ volt battery 38, and the lead to the plate also passes into chamber 21 through a Kovar seal 36. The meter 12 previously referred to is in the plate circuit as shown, and has a range from zero to 20 microamperes. The grid bias is supplied by a 7½ volt battery 40. In the grid circuit is a multiple tap switch which is the sensitivity control of the instrument as designated by numeral 42. This control comprises a potential divider involving resistances 43, 44, and 45 as shown and having taps 46, 47, 48, and 49 associated therewith. Numeral 50 designates a slider or contact movable from one to another of the taps, the slider being adjustable by the previously described knob 23. The mechanical construction and arrangement of the grid circuit potential divider, that is, the sensitivity control will be described more in detail in connection with the description of Fig. 3. The resistors 43, 44, and 45 have resistances of $10^9$, $10^{10}$, and $10^{11}$ ohms corresponding to the graduated scale adjacent to the knob 23 in Fig. 1.

At the cathode end of the grid circuit is a control switch 25, which is a multiple control switch as described above. The grid circuit is completed through a potentiometer 52 as shown, and the lead to the slider of this potentiometer passes into the evacuated chamber through Kovar seal 59. The switch blade 51 is in an auxiliary circuit which includes the battery 40, the meter 12, and two fixed resistances 53 and 54, the current in this circuit directionally opposing the plate current of the tube in a manner well known to the art.

The ionization chamber 15 is diagrammatically indicated on Fig. 2, the cylinder thereof, that is the chamber, being connected to ground as shown, and the negative electrode 56 thereof being connected to the slider 50 of the sensitivity controller, the lead passing through a Kovar seal 55 into the evacuated chamber 21. Thus, it is to be seen that the ion current circuit includes the sensitivity controller 42, the slider of potentiometer 52, resistance 54, batteries 40 and 38, and additionally a battery 57, of 45 volts to provide an ion collecting potential, the positive side of which is connected to ground through a fixed protective resistor 58. The batteries are connected so that potentials are additive; thus, approximately 60 volts is applied between the electrode 56 of the ionization chamber and the conductive coating, previously referred to, on the inside of chamber 15. The resistances 53 and 54 are, of course, of proper ohmage suited to the constants of the other circuit elements to produce the desired operating results, as will be described.

As has been previously pointed out, one of the principal objectives of my invention is the overcoming of instability in electronic instruments of this type; it being known from experience that instability of the instruments, failure to hold calibration, and spurious or erroneous responses, were traceable in part to conditions resulting from exposure of the instruments to humid air. In general, the effect of such exposure was to cause the constants of circuit elements to change, and more particularly to bring about changes in leakage between leads associated with the amplifier tube and elements of the range selecting or sensitivity switch, principally leakage between the grid and the plate circuits.

Enclosing the amplifier tube and its associated sensitivity selecting components within an evacuated compartment seeks, therefore, to eliminate such variations in electrical leakage and ionization of air in the vicinity of the vacuum tube leads that would alter the intended potential of the grid. The leakages, in addition to altering the grid potential by an amount proportional to the grid resistor, the leakage resistance, and potentials of the conductors between leakage paths, also shunted the grid resistors. Both of these factors introduced false readings by shifting the operating point of the amplifier tube and by reducing the resistance of the input circuit. Spurious response results from ionization of air adjacent to the grid lead of the amplifier tube. Depending upon the intensity of radiation and the geometry of the enclosing shield with reference to the tube leads, ion collection became spurious resulting in extreme cases in electron collection by the grid with resultant reversed meter readings. Both the effects of leakage and of spurious response due to ionization, can be eliminated by placing portions of an electronic ionization measuring circuit in a vacuum.

Referring to Fig. 3 of the drawings, the evacuated chamber 21 is shown with its associated structural parts, the evacuated chamber being formed within the cylindrical component 22 as shown which is closed at the bottom end by a head or plate 60 having a valve and tube associated therewith for evacuation purposes as will presently be described. The cylinder 22 has cutaway portions or openings shown at 61 in its sides near the upper part, to permit wires to be connected to the Kovar seal leads, and below these openings the cylinder is sealed by a metallic disc 62 which is vacuum sealed to the inside walls of cylinder 21 by a selected type of commerial wax used for vacuum sealing. The vacuum tube 30 is a relatively small tube which is disposed within the evacuated enclosure and may be suspended by its leads. The resistors 43, 44, and 45 are within the chamber 21 and are vertically disposed, as shown, being connected to contact clips as will be described. Spaced from the disc 62 is another disc 63 near the upper part of the cylinder 22, these two discs being spaced by rods 64 and 65 which are threaded at both ends. The disc 63 is secured to the upper ends of the rods by nuts on either side of the disc as shown. The rods pass entirely through the disc 62 being soldered and sealed thereto, and at the lower ends they support a contact-carrying disc 66 which carries a plurality of contact members 46, 47, 48, and 49 angularly arranged and the contacts of which constitute the taps 46, 47, 48, and 49 described in connection with Fig. 2 (also, see Fig. 5). The disc 66 is attached to the lower ends of the rods 64 and 65 by nuts on either side of the disc as shown. Cooperating with these contacts is a rotatable switch blade 50 (see Fig. 5) which is operated by a finger 67 extending downwardly from a shaft 68 passing through a sleeve or bushing 69 centrally located in the disc 62 and sealed thereto and having a flange as shown at its lower end. At the upper end of the shaft 68 is a narrow finger which engages in a slot in the hub of a toothed wheel 81 which is rotatable, as will be described, by shaft 70 outside of chamber 21 which carries the sensitivity adjusting knob 23 previously referred to. The shaft 68 is within a rubber or Neoprene tube 80 forming a seal, the lower end of this tube being fitted over bushing 69 and the upper end fitting around the hub of the toothed wheel 81, the ends of the tube being sealingly secured by a wire wound tightly around each end of the tube to provide the seal. When the shaft 68 is turned to operate the switch within the evacuated chamber, the tube 80 twists, that is, is placed under torsional stress without breaking the seals at its ends and without rupturing the tube. The shaft 70 passes through disc 71 at the upper end of the chamber 21, through a screw-threaded fitting 72 which is secured to the disc 71 by nut 73, the fitting having a collar 74 on the opposite side of the disc 71 as shown. The toothed wheel 81 cooperates with a spring finger supported by index bracket 82, which normally bears against its teeth so that it moves in well defined steps. The switch contact finger 50 is adjustable by rotation of the shaft 70 so as to bring it into contact successively with the contact points 46, 47, 48, and 49 which are connected through the contact clips as shown to grid resistors 43, 44, and 45 forming the potential divider 42 as described. It is to be seen therefore, that the sensitivity control 42 can be operated from outside the evacuated chamber by means of rotation of the shaft 70 by the knob 23. The Kovar seals previously described in connection with Fig. 2 are visible on Fig. 3 as are various of the leads and the connections to resistors 43, 44, and 45.

The lower end of the chamber 21 is closed by disc 60 as described. Near the periphery of the disc 60 there is attached by soldering, or the like, a block 76 having a horizontal screw threaded bore as shown communicating with a relatively small counter bore which is adapted to receive a needle valve 77 having a screw threaded portion of a size to fit the screw threaded bore in block 76. The counter bore in block 76 communicates with a drilled opening which is aligned with an opening 79 through the disc 60 into the interior of the evacuated chamber. The horizontal bore in block 76 has communicating therewith a tube 78 which is soldered to the block 76. This tube provides for evacuation of the chamber 21 by attaching a flexible vacuum line to the tube 78. In my invention the seals and fittings associated with vacuum chamber 21 are sufficiently tight to provide for securing a vacuum equivalent to 29 inches of mercury within the chamber.

In the operation of the meter of my invention, when the amplifier is turned on by turning the knob 25, switch blades 33 and 51 are brought into contact with their associated fixed contacts closing both the cathode circuit and the grid circuit. The switch 25 is of the well known type wherein initial closing movement brings blades 33 and 51 into engagement with their associated contacts and further movement adjusts potentiometer 52. The slider 50 of the sensitivity controller at this time is preferably, but not necessarily, at zero set, that is, in contact with the tap 46. The instant the amplifier is turned on the grid is negative 7½ volts but exponentially decreases to about 1¼ volts due to the time constant of the grid resistors and the distributed capacity of the grid circuit. This space charge limits the space current until the cathode is at operating temperature. This is of benefit in preventing destabilization of the cathode and resultant amplifier instability. When switch blade 51 is in the open position there is no current in the circuit of battery 40, resistors 53 and 54, and the potentiometer 52. This circuit may be called a combination meter balancing network and bias control circuit. In other words, when switch blade 51 is in the open position, all portions of this resistance network are at the full negative value of the battery 40 with respect to the filament of the tube as is the slider of potentiometer 52, as well as the resistors 43, 44, and 45, and the grid of tube 30.

Normally the grid of the tube is at a potential sufficiently negative to space charge limit the emission of the cathode at the instant the switch 25 is closed and so remains for one to two seconds due to the time constant of the resistance-capacity network represented by the distributed capacitance of the wiring of the grid circuit and the input resistors 43, 44, and 45. The grid of the tube prior to closing the switch is at 7½ volts negative potential with respect to the filament in the circuit with the parameters existing therein. This potential decreases to 1¼ volts in a matter of about eight seconds, at which time the instrument can be zeroed and used. It is to be seen, therefore, that the tube is automatically space charge limited for a brief period of time by reason of the exponential potential decay at the grid of the amplifier tube, due to the resistance-capacitance network represented by the resistance and capacity associated with the grid circuit. The time delay whereby the space charge limiting is accomplished is achieved without relays or unusual switching arrangements which might otherwise be used to prevent cathode damage by the application of plate potentials before proper cathode operating temperatures are obtained.

The auxiliary circuit of meter 12 including resistances 53 and 54 opposes the current of the plate circuit within the meter, that is, the instrument may be set to zero by adjusting the potentiometer 52. The meter can be made to read zero by adjusting potentiometer 52 since this potentiometer is in the grid circuit of the tube and thus controls the potential thereto. By adjusting the potentiometer 52 the plate current of the amplifier is adjusted within predetermined limits to compensate for battery voltage variations and minor variations in tube characteristics. The resistance value of this potentiometer in proportion to the values of the resistors 53 and 54 in the bias adjusting and meter balancing network is restricted to a relatively narrow range. By so restricting the range through which the instrument can be "zero set" the operator of the instrument will be warned of conditions which would effect the calibration of the radiation meter, such as: low or defective batteries, excessive insulation leakage between circuit elements, or a defective amplifier tube.

A properly constructed radiation meter with the vacuum enclosure under 29 inches of Hg vacuum has only one area of leakage, that of the Kovar insulator 55, exposed to the effects of humid air which can produce erroneous readings. By virtue of the switching arrangement of the sensitivity switch 42 the leakage of this one area can be tested to determine if sufficient leakage is present to result in erroneous readings. The instrument is turned on, and zeroed with the selector blade 50 connected to tap 46. If appreciable leakage is present on the Kovar insulator 55, an increase in the reading of the microammeter 12 will occur when selector blade 50 is moved to either of the taps 47, 48, or 49. This test presupposes that the instrument is not subjected to a radiation field sufficient to produce readable deflections of the microammeter 12. The difficulty of maintaining the resistance path of insulator 55 at infinite resistance is recognized and sufficient zero resetting potential is available through adjustment of potentiometer 52 to permit resetting the zero for small values of leakage. These factors are, of course, of rather important significance in the light of the objectives of the instrument since it is desired that it be accurate and that it remain accurate.

Figure 4:
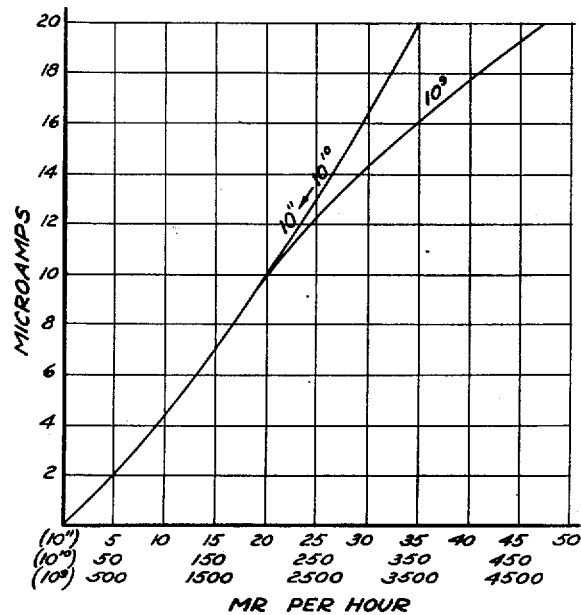
Fig. 4 is a display of a typical calibration chart obtained with the instrument.

In using the instrument it may, of course, be carried about from place to place wherever it is desired to probe and determine the possibility of the existence of radiation. Any ionization taking place in the ionization chamber produces a current in the ionization circuit and with the slider 50 of the sensitivity controller 42 in contact with one of its associated taps 47, 48, or 49, there is a voltage drop through the resistors of the sensitivity controller which causes a signal to be impressed on the grid of the tube 30. For instance, if the slider is in contact with the tap 47, the ionization current produces a voltage drop through the resistor 43 and a proportional signal is impressed on the grid of the tube and the instrument will respond accordingly giving a reading on the meter 12 in microamperes and the corresponding amount of radiation may be read from the chart of Fig. 4 using one of the MR scales corresponding to the setting of sensitivity controller 42.

The sensitivity control is changed, of course, by moving the slider 50 from one to another of its associated taps; for instance, when it is moved from tap 47 to 48 the sensitivity of the instrument is increased by a factor of 11 since the ionization current now passes through both the resistances 44 and 43. Since the resistance 44 is ten times as great as that of resistance 43, and, as pointed out, both resistances are now in the circuit, the sensitivity is then increased by a factor of 11. In other words, the signal impressed on the grid of the tube 30 for the same ionization current is proportionately 11 times greater.

With my instrument I have found that the curve of pressure within the evacuated chamber against instrument reading is linear and an accurate check of the vacuum within the chamber can be obtained by setting the input switch, that is the sensitivity controller, to zero set and exposing the instrument to a strong source of gamma radiation. With one particular instrument it was found that when a 10 mg. Ra source was placed against the evacuated enclosure which was at a vacuum of 29 inches of mercury no perceptible deflection of the meter was observed. With the same source, and at 16 inches of vacuum, the meter gave a reading of 20 microamperes.

From the foregoing those skilled in the art will observe that I have provided a very convenient and readily usable radiation meter, and it will be appreciated that it accomplishes the intended results of achieving accuracy, stability, freedom from deleterious effects of humidity and particularly spurious response. It also achieves dependability of calibration. My instrument has been found to be accurate, stable, and free from spurious response and drift for the reasons outlined, in that variations in leakage and ionization of air in the vicinity of the tube have been eliminated due to the fact that the enclosing compartment is evacuated.

The foregoing disclosure is representative of a preferred form of my invention, and it is to be understood that the principles of the invention may be practiced in various forms and modifications thereof. The disclosure herein is to be interpreted therefore in an illustrative rather than a limiting sense.

I claim:

1. In a tube circuit including a multielement tube, in combination, means for automatically space charge limiting the tube to prevent destabilization and damage to the cathode during its warm-up period comprising a predetermined negative grid bias potential supply which is normally on the grid when the tube is non-operative, means for applying a normal potential to said grid, a normally open switching element for controlling the application of said normal potential to the grid, cathode heating means, a second normally open switching element for controlling the operation of said heating means, and a mechanical connection between said two switching elements for constraining said elements to simultaneous operation, the grid circuit involving a resistance-capacitance time delay network such that when normal operating potentials are applied to the tube the grid remains sufficiently negative to space charge limit the emission of the cathode until it reaches normal operating temperature.

2. An electronic circuit comprising an electron tube having at least a cathode, anode and control grid, a first source of potential applied between said cathode and said anode, a second source of potential, a third source of potential, a potentiometer, a connector from the slider of said potentiometer to said control grid, a connector from one side of said potentiometer to the negative side of said second source of potential, there being capacitance between said control grid and said cathode, a connector from the positive side of said second source of potential to the cathode and switching means for simultaneously connecting the other side of said potentiometer to the positive side of said second source of potential and applying said third source of potential to the heater element of said cathode.

3. Apparatus in accordance with claim 1 wherein said capacitance is the interelectrode and associated wiring capacitance between said cathode and said control grid of said electron tube.

4. In a tube circuit including a multi-element tube, in combination, means for automatically space charge limiting the tube to prevent destabilization and damage to the cathode during its warm-up period, comprising a grid member adjacent to the cathode of the tube, grid bias potential supply means including means for applying different potentials to the grid, circuit means whereby a relatively high negative potential is on said grid member when the tube is non-operative, said circuit involving a resistance-capacitance time delay network, a first switching element controlling said grid bias potential supply, circuit connections controlled by said first switching element to connect a relatively lower potential to said grid member, a cathode heater supply circuit including a second switching element, and means for simultaneously closing said two switching elements, the time delay network operating to cause the grid member to remain sufficiently negative to space charge limit the emission of the cathode until it reaches normal operating temperature.

5. An electronic circuit comprising a tube having a cathode, anode, and a control grid, means for heating said cathode and means for applying a potential to the anode, means forming a grid circuit network comprising a grid biasing potential supply, a connection from the negative side of said supply to the grid, said grid circuit having a parallel branch which is open when the tube is not operating, said circuit network having a resistance therein which is common to the grid connection and the parallel branch circuit, there being capacitance between said control grid and said cathode, switching means in said parallel branch for controlling the grid circuit network, additional switching means for controlling said cathode heating means, and a mechanical tie between said two switching means for constraining said two switching means to simultaneous operation.

6. The arrangement of claim 5 wherein said resistance is in the form of a potentiometer having its slider connected to the control grid, said resistance being relatively small as compared to the circuit constants of the grid circuit network providing for a relatively narrow range of adjustment of grid bias potential.

7. The arrangement of claim 5 wherein said resistance is in the form of a potentiometer having its slider connected to the control grid, said parallel branch circuit having a portion in common with the output circuit of the tube and a meter in said common portion.

8. In a tube circuit including a multi-element tube, in combination, means for automatically space charge limiting the tube to prevent destabilization and damage to the cathode during its warm-up period comprising a grid member adjacent to the cathode of the tube, grid bias potential supply means including means for supplying different potentials to the grid, circuit means whereby a relatively high negative potential is on said grid member when the tube is non-operative, a first switching means controlling said grid bias potential supply, circuit connections controlled by said first switching means to connect a relatively lower potential to said grid member, a cathode heater supply circuit including a second switching means, and means for simultaneously actuating said two switching means, the said circuit means embodying a time delay characteristic means operative to cause the grid member to remain sufficiently negative to space charge limit the emission of the cathode until it reaches normal operation temperature.

9. An electronic circuit comprising an electron tube having at least a cathode, anode and control grid, said grid and cathode having substantial stray capacitance therebetween, a manually operable gang switch having first and second simultaneously operable normally open switching elements, a cathode heater circuit including a voltage supply and the first of said switching elements, a source of grid bias voltage of sufficient magnitude to prevent flow of anode current in said tube, a connection between the positive side of said source and said cathode, a resistive connection between the negative side of said source and said grid, and a circuit, including the second of said switching elements, interconnected between said cathode and a point on said resistive connection.

CHARLES O. BALLOU.

REFERENCES CITED

The following references are of record in the file of this patent:

UNITED STATES PATENTS

| Number | Name | Date |
| --- | --- | --- |
| 2,100,195 | Lowry | Nov. 23, 1937 |
| 2,100,735 | Dawson | Nov. 30, 1937 |
| 2,122,222 | Vingerhoets | June 28, 1938 |
| 2,147,449 | Lee | Feb. 14, 1939 |
| 2,294,759 | Morack | Sept. 1, 1942 |
| 2,419,340 | Easton | Apr. 22, 1947 |
| 2,462,140 | Spicer | Feb. 22, 1949 |